United States Patent
Leung

(10) Patent No.: US 9,905,317 B2
(45) Date of Patent: Feb. 27, 2018

(54) NUCLEAR FUSOR APPARATUS

(71) Applicant: Jackal Growl Publishing Co. Limited, Hong Kong (HK)

(72) Inventor: Sik Kau Leung, Hong Kong (HK)

(73) Assignee: Jackal Growl Publishing Co. Limited, Hong Kong (HK)

( * ) Notice: Subject to any disclaimer, the term of this patent is extended or adjusted under 35 U.S.C. 154(b) by 677 days.

(21) Appl. No.: 14/580,168

(22) Filed: Dec. 22, 2014

(65) Prior Publication Data

US 2016/0365159 A1  Dec. 15, 2016

(30) Foreign Application Priority Data

Dec. 23, 2013  (CN) .......................... 2013 1 0717917

(51) Int. Cl.
  *G21B 1/05*  (2006.01)
  *F01K 25/10*  (2006.01)
  *F22B 1/02*  (2006.01)

(52) U.S. Cl.
  CPC .............. *G21B 1/05* (2013.01); *F01K 25/10* (2013.01); *F22B 1/023* (2013.01); *G21Y 2004/30* (2013.01); *Y02E 30/126* (2013.01)

(58) Field of Classification Search
  CPC ............ G21B 1/05; F01K 25/10; F22B 1/023
  USPC ................ 376/121, 122, 123, 132, 146, 326
  See application file for complete search history.

(56) References Cited

U.S. PATENT DOCUMENTS

| | | | | |
|---|---|---|---|---|
| 3,512,852 A * | 5/1970 | North | ...................... | H02N 15/00 250/559.3 |
| 3,723,246 A * | 3/1973 | Lubin | ...................... | G21B 1/19 376/122 |
| 3,873,930 A * | 3/1975 | Winterberg | .............. | H01G 2/22 376/146 |
| 4,560,528 A * | 12/1985 | Ohkawa | .................. | G21B 1/052 376/121 |
| 9,278,627 B2 * | 3/2016 | Leung | ...................... | B60L 13/04 |
| 2014/0301519 A1 * | 10/2014 | McGuire | .................. | G21B 1/05 376/142 |

OTHER PUBLICATIONS

Kesner, "Results from the Levitated Dipole Experiment", Fusion Power Associates 32nd Annual Meeting, Dec. 2011.*

(Continued)

*Primary Examiner* — Jack W Keith
*Assistant Examiner* — Daniel Wasil

(57) ABSTRACT

A nuclear fusor apparatus includes magnetically conductive spherical shell, solid iron ball, annular ferromagnetic guide rails, orbiting members, ignition, and gas outlet for transmitting mixed gas of deuterium and tritium, wherein the annular ferromagnetic guide rails are symmetrically fixed on an outer wall of the spherical shell; the orbiting members are located above the annular ferromagnetic guide rails; the orbiting members cooperate with the annular ferromagnetic guide rails to generate magnetic levitation force and propelling force; a water pipe is positioned inside the spherical shell, an end of the water pipe is connected to a water pump, another end of the water pipe is connected to an air extraction unit; the ignition and the gas outlet are both fixed on the outer wall of the spherical shell, an ignition end of the ignition extends into the spherical shell, and an end of the gas outlet extends into the spherical shell.

15 Claims, 2 Drawing Sheets

(56) References Cited

OTHER PUBLICATIONS

Garnier, "Confinement Improvement with Magnetic Levitation of a Superconducting Dipole", 22nd IAEA Conference on Plasma Physics and Controlled Fusion, Oct. 2008.*
Zhukovsky, "Thermal Performance of the LDX Floating Coil", Cryogenic Engineering Conference, Aug. 2005.*
Kesner, "Plasma Confinement in a Levitated Dipole", 17th IAEA Conference of Plasma Physics and Controlled Nuclear Fusion, 1998, paper IAEA-FL-CN-69/IC.*

* cited by examiner

NUCLEAR FUSOR APPARATUS

CROSS REFERENCE TO RELATED APPLICATIONS

The present patent application claims the benefit of Chinese patent application No. 201310717917.9 filed on Dec. 23, 2013, the entire contents are incorporated by reference.

TECHNICAL FIELD

The present patent application relates to a nuclear fusion apparatus, and particularly to a nuclear fusor apparatus.

BACKGROUND

In nuclear fusion, a huge amount of energy is released when light nuclei (for example, deuterium and tritium) are combined into a relatively heavy nucleus (for example, helium). Nuclear fusion refers to a nuclear reaction form in which a nucleus aggregation effect takes place. Such a reaction needs certain conditions, such as super high temperature and pressure, in order to generate a new nucleus of a bigger mass from atoms of smaller lower masses (mainly deuterium or tritium), along with release of a huge amount of energy. However, controlled nuclear fusion has proven very difficult so far, and therefore it is very difficult to effectively utilize the energy released from nuclear fusion.

SUMMARY

The present patent application provides a nuclear fusor apparatus, so as to effectively control, by magnetic confinement effect, a nuclear fusion reaction of mixed gas of deuterium and tritium inside a spherical shell, and convert energy released from nuclear fusion into vapor for output.

The present patent application provides a nuclear fusor apparatus including a magnetically conductive spherical shell, a solid iron ball, a plurality of the annular ferromagnetic guide rails, an orbiting member, an ignition, and a gas outlet used for transmitting mixed gas comprising deuterium and tritium. The annular ferromagnetic guide rails are symmetrically fixed on the outer wall of the spherical shell. The orbiting member is located above the annular ferromagnetic guide rail, and cooperates with the annular ferromagnetic guide rail to generate a magnetic levitation force and a propelling force. A water pipe is positioned inside the body of the spherical shell. One end of the water pipe is connected to a water pump, while the other end of the water pipe is connected to an air extraction unit. The ignition and the gas outlet are both fixed on the outer wall of the spherical shell, the ignition extends into the spherical shell, and the gas outlet also extends into the spherical shell.

The present patent application has the following advantages:

In the present patent application, magnetic levitation as a result of the cooperation between an orbiting member and an annular ferromagnetic guide rail enables generation of magnetic field lines. The magnetic field lines change along a rotational direction of the orbiting member, and between the orbiting member and the annular ferromagnetic guide rail, and under the effect of the magnetic field lines, a solid iron ball is levitated and rotates. The iron ball is synchronous with the orbiting member and is rotatable in a same direction at a speed multiple of the external rotational speed. During rotation, the iron ball directly forms a narrow channel with a space inside a spherical shell and closes to form a controllable magnetic confinement space. When mixed gas of deuterium and tritium is introduced into the magnetic confinement space and is ignited by an ignition at a temperature favoring nuclear fusion, thereby initiating a nuclear fusion reaction. The nuclear fusion reaction is confined inside the magnetic confinement space and operates in surge electrical magnetism in a direct-state flow direction, so that effective control is achieved through speed manipulation of the orbiting member. The energy released is dynamically absorbed by the solid iron ball in a process of conversion between a gaseous state and a solid state, and the orbiting member decides electromagnetic intensity through speed and ensures that the temperature inside the spherical shell is not excessively high, and a nuclear fusion reaction is further controlled effectively. Moreover, the energy is further utilized for heating the mixed gas of deuterium and tritium that continuously enters the magnetic confinement space, so as to sustain a chain nuclear fusion reaction. Besides, water in a water pipe is heated and vapor is properly discharged to achieve effective utilization, for example, for driving a steam/gas turbine to actuate an electric generator to generate power.

Figure 1:
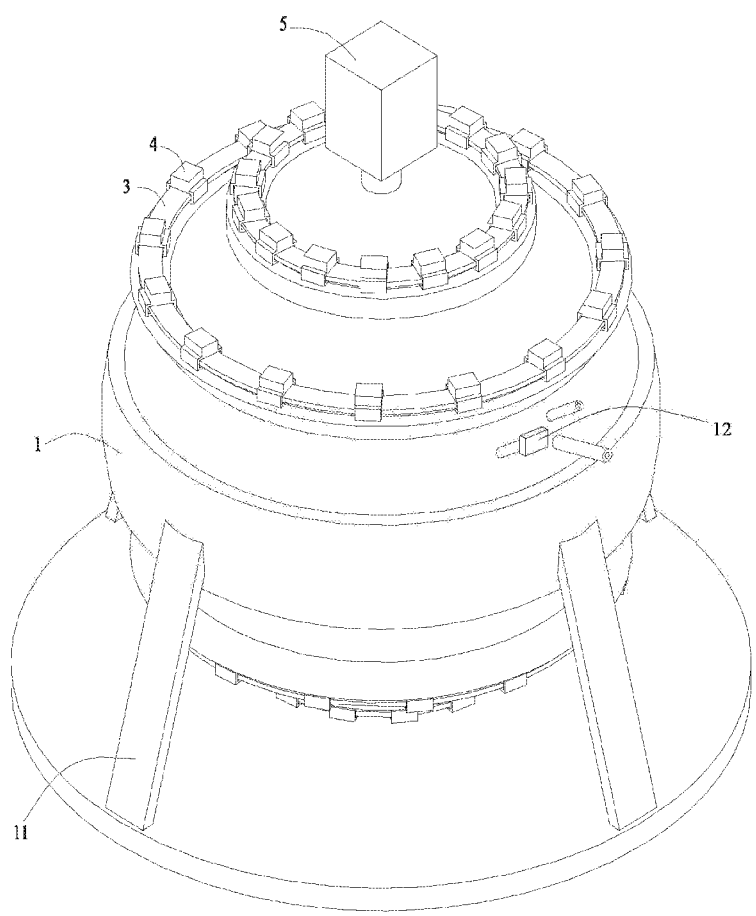
FIG. 1 is a schematic structural perspective view of a nuclear fusor apparatus according to the present patent application (a gas outlet, a water pump, and an air extraction unit are omitted)

In the drawings, 1: spherical shell; 2: solid iron ball; 3: annular ferromagnetic guide rail; 4: orbiting member; 5: ignition; 6: gas outlet; 7: water pipe; 8: water pump; 9: air extraction unit; 10: magnetic confinement space; 11: support; 12: vacuum extraction unit

DETAILED DESCRIPTION

Reference will now be made in detail to a preferred embodiment of the nuclear fusor apparatus disclosed in the present patent application, examples of which are also provided in the following description. Exemplary embodiments of the nuclear fusor apparatus disclosed in the present patent application are described in detail, although it will be apparent to those skilled in the relevant art that some features that are not particularly important to an understanding of the nuclear fusor apparatus may not be shown for the sake of clarity.

Furthermore, it should be understood that the nuclear fusor apparatus disclosed in the present patent application is not limited to the precise embodiments described below and that various changes and modifications thereof may be effected by one skilled in the art without departing from the spirit or scope of the protection. For example, elements and/or features of different illustrative embodiments may be combined with each other and/or substituted for each other within the scope of this disclosure.

Figure 2:
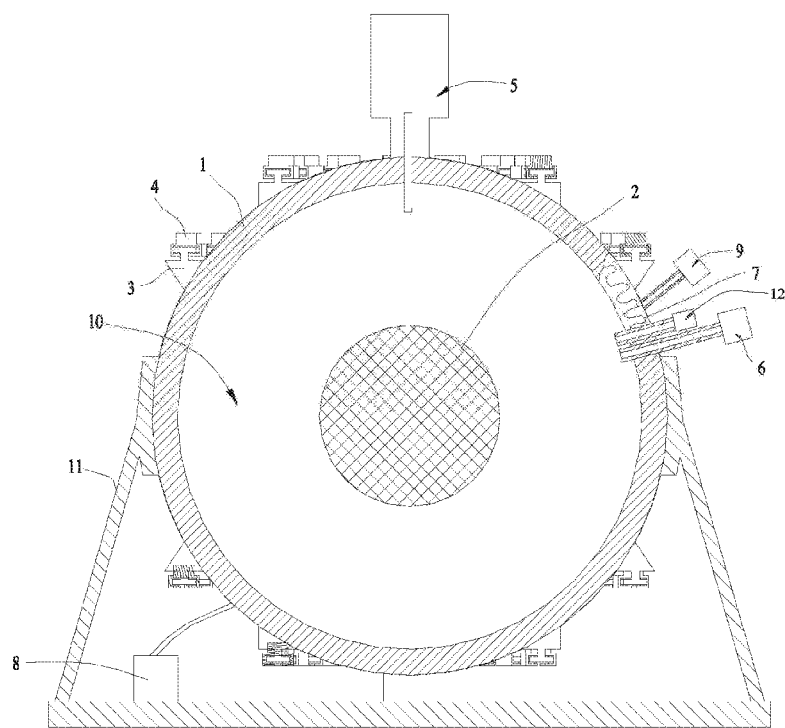
FIG. 2 is a schematic structural sectional view of a nuclear fusor apparatus according to the present patent application.

A nuclear fusor apparatus shown in FIG. 1 and FIG. 2 includes a magnetically conductive spherical shell 1, a solid iron ball 2, an annular ferromagnetic guide rail 3, an orbiting member 4, an ignition 5, and a gas outlet 6 used for transmitting mixed gas of deuterium and tritium. A plurality of the annular ferromagnetic guide rails 3 are symmetrically fixed on an outer wall of the spherical shell 1. The orbiting member 4 is located above the annular ferromagnetic guide rail 3, and cooperates with the annular ferromagnetic guide rail 3 to generate a magnetic levitation force and a propelling force. A water pipe 7 is positioned inside a body of the spherical shell 1. One end of the water pipe 7 is connected to a water pump 8, and the other end of the water pipe 7 is connected to an air extraction unit 9. The ignition 5 and the gas outlet 6 are both fixed on the outer wall of the spherical shell 1, the end of the ignition apparatus 5 extends into the spherical shell 1, and the end of the gas outlet 6 also extends into the spherical shell 1.

Levitated and propelled by the annular ferromagnetic guide rail 3, the orbiting member 4 rotates along the circumference of the spherical shell 1, and the mutual magnetic levitation effect between the orbiting member 4 and the annular ferromagnetic guide rail 3 generates magnetic field lines, of which the density is directly proportional to the rotational speed of the orbiting member 4. The solid iron ball 2 is positioned inside the spherical shell 1. The magnetic field lines penetrate into the solid iron ball 2 under magnetic induction effect, thereby enabling the solid iron ball 2 to be levitated at the center of the spherical shell 1 and to rotate along a rotational direction of the orbiting member 4, and a closed magnetic confinement space 10 is formed between the solid iron ball 2 and the spherical shell 1.

The ignition 5 ignites a mixed gas of deuterium and tritium inside the spherical shell 1 through the ignition end. The mixed gas of deuterium and tritium is heated into plasma, and a nuclear fusion reaction occurs inside the magnetic confinement space 10, resulting in release of energy. With the released energy, the solid iron ball 2 is kept in a narrow magnetic confinement space and heat is applied to facilitate cyclic conversion between the gaseous state and the solid state, and the solid iron ball 2 is used for absorbing excessive energy to keep a dynamic balance of energy inside the spherical shell 1. Additionally, mixed gas of deuterium and tritium that is continuously introduced into the magnetic confinement space 10 is heated into plasma and a nuclear fusion reaction occurs, so as to keep a chain nuclear fusion reaction of the mixed gas of deuterium and tritium. Furthermore, water inside the water pipe 7 is further heated to form vapor, and the vapor is discharged by using the air extraction unit 9.

Magnetic levitation cooperation between the orbiting member 4 and the annular ferromagnetic guide rail 3 enables generation of magnetic field lines, which change along the rotational direction of the orbiting member 4. Under the effect of the magnetic field lines, the solid iron ball 2 is levitated, and rotates in the same direction as that of the orbiting member 4. Moreover, the solid iron ball 2 can shield the magnetic field lines, that is, due to the spherical and solid structure of the solid iron ball 2, when passing through the solid iron ball 2, the magnetic field lines lift the solid iron ball 2 and cause the solid iron ball 2 to rotate. A direct proportion of 1:3 is set between the density of the magnetic field lines and the rotational speed of the orbiting member 4, where the magnetic field lines are generated under the common effect of the solid iron ball 2, the orbiting member 4, and the annular ferromagnetic guide rail 3, so as to close with the spherical shell 1 to form the magnetic confinement space 10. As the orbiting member 4 rotates around the spherical shell 1, strong magnetism generated by the orbiting member 4 forcefully enters the solid iron ball 2, and the electromagnetic field increases with the rotational speed of the orbiting member. In this way, the strength of electromagnetic field inside the cavity of the spherical shell 1 can be controlled. In essence, the intensity of electromagnetic field can be manipulated by speed, which is more desirable than a conventional Tokamak confined electromagnetic flow. Moreover, the conventional Tokamak confined electromagnetic flow cannot generate electricity but instead only consumes electricity, making electric consumption outweigh generation in the present nuclear fusion process.

When the mixed gas of deuterium and tritium that is introduced inside the magnetic confinement space 10 is ignited by the ignition 5 to a temperature of a nuclear fusion condition, a nuclear fusion reaction occurs, and the nuclear fusion reaction is confined inside the magnetic confinement space 10, so that energy is effectively confined and limited. The released energy is dynamically absorbed by the solid iron ball 2 in a process of conversion between a gaseous state and a solid state, so as to ensure that the temperature inside the spherical shell 1 is not excessively high, rendering the nuclear fusion reaction under effective control. When energy inside the spherical shell 1 is excessive, the solid iron ball 2 absorbs the energy and gasifies. The gasified solid iron ball 2 will still be limited outside the magnetic confinement space 10, so as to keep the spherical structure thereof; and when energy is insufficient to gasify the solid iron ball 2, the gasified solid iron ball 2 solidifies to form a solid state to release energy, thereby keeping dynamic feedback, return of energy and a continuous balance of energy that shall be released. Moreover, because the element iron has the highest binding energy, a nuclear fusion reaction hardly occurs in the solid iron ball 2 at high temperature, and the solid iron ball 2 can reach cyclic conversion between a gaseous state and a solid state.

The energy released from nuclear fusion of the mixed gas of deuterium and tritium is further used as a capability of heating mixed gas of deuterium and tritium that continuously enters the magnetic confinement space 10 to initiate a chain nuclear fusion reaction, so as to keep the high temperature required for nuclear fusion without continuous ignition by the ignition 5.

Additionally, the energy released from nuclear fusion of mixed gas of deuterium and tritium further heats water in the water pipe 7 to form high temperature steam, which is removed by the air extraction unit 9 for effective utilization, for example, driving a steam/gas turbine to actuate an electric generator.

According to the required magnetic field intensity of the magnetic confinement space 10 during a nuclear fusion reaction, the rotational speed and direction of the orbiting member 4 may be controlled, and the orbiting members 4 may have different speeds and rotational directions. The orbiting member 4 may appear in an arc shape, and the perimeter of which is smaller than that of the annular ferromagnetic guide rail 3, that is, one arc-shaped orbiting member 4 is arranged for each annular ferromagnetic guide rail 3. A plurality of orbiting members 4 independent from each other as shown in FIG. 1 and FIG. 2 of this embodiment may also be set, and is distributed at an interval around the circumference of the annular ferromagnetic guide rail 3, that is, a plurality of the orbiting members 4 are arranged for each annular ferromagnetic guide rail 3.

The nuclear fusor apparatus in this embodiment further includes a vacuum extraction unit 12. The vacuum extraction unit 12 is fixed on the outer wall of the spherical shell 1, and has an extraction end extending into the spherical shell 1. Correspondingly a pressure relieving/reducing apparatus may be arranged both on and under the spherical shell 1, and gas, water, and other residual compounds are discharged at suitable pressure.

In this embodiment, four annular ferromagnetic guide rails 3 are evenly distributed along a vertical direction on the spherical shell 1, and to ensure that the spherical shell 1 is stable, the spherical shell 1 is fixed by a support 11.

To heat the water pipe 7 thoroughly and uniformly, the water pipe 7 is coiled inside the body of the spherical shell 1, and the high temperature generated from nuclear fusion may be reduced by the body of the spherical shell 1 by means of heat transfer to the water pipe 7, and the water pipe 7 is in a coil pipe form to increase a contact area for high temperature energy.

To help reach the high temperature needed for a nuclear fusion reaction, the ignition 5 can be a laser heating apparatus, or a Shenguang heating apparatus. The maximum laser output power of a currently existing laser heating apparatus reaches one hundred trillion watts and is sufficient to "ignite" nuclear fusion, that is, high temperature of about one hundred thousand degrees Celsius is needed. In addition to laser heating, a heating method using ultra high frequency microwaves may also be used to reach the "ignition" temperature.

It may be understood that a small part of energy generated from nuclear fusion remains inside the magnetic confinement space 10 to keep a chain reaction, and the rest large part of energy is used for heating water in the water pipe 7 to generate steam used for driving a steam/gas turbine to generate power.

While the present patent application has been shown and described with particular references to a number of embodiments thereof, it should be noted that various other changes or modifications may be made without departing from the scope of the present invention.

The invention claimed is:

1. A nuclear fusor apparatus comprising:
a magnetically conductive spherical shell,
a solid iron ball,
a plurality of annular ferromagnetic guide rails,
a plurality of orbiting members,
an ignition, and
a gas outlet for transmitting mixed gas of deuterium and tritium,
wherein the annular ferromagnetic guide rails are symmetrically fixed on an outer wall of the spherical shell; the orbiting members are located above the annular ferromagnetic guide rails; the orbiting members cooperate with the annular ferromagnetic guide rails to generate a magnetic levitation force and a propelling force; a water pipe is positioned inside the spherical shell, an end of the water pipe is connected to a water pump, another end of the water pipe is connected to an air extraction unit; the ignition and the gas outlet are both fixed on the outer wall of the spherical shell, an ignition end of the ignition extends into the spherical shell, and an end of the gas outlet extends into the spherical shell;
wherein the propelling force of the annular ferromagnetic guide rails causes rotation of the orbiting members along a circumferential direction of the annular ferromagnetic guide rails;
the orbiting members and the annular ferromagnetic guide rails are arranged to cause a mutual magnetic levitation effect therebetween, which effect causes generation of magnetic field lines having a density that is directly proportional to a rotational speed of the orbiting members;
the solid iron ball is positioned inside the spherical;
the generated magnetic field lines penetrate into the solid iron ball under a magnetic induction effect to cause rotation of the solid iron ball along a rotational direction of the magnetic field lines and cause levitation of the solid iron ball at a center of the spherical shell;
a closed magnetic confinement space is located between the solid iron ball and the spherical shell;
the ignition end is configured to cause ignition of mixed gas of deuterium and tritium positioned inside the spherical shell;
the ignition causes the mixed gas to be heated into plasma, which results in a nuclear fusion reaction inside the magnetic confinement space, which releases energy;
the solid iron ball is arranged to remain in a predetermined magnetic confinement space during the release of energy;
the released energy imparts heat to the solid iron ball, which causes the solid iron ball to reach a temperature at which cyclic conversion occurs between a gaseous state and a solid state;
the solid iron ball is configured to absorb excessive released energy in maintaining a dynamic balance of energy inside the spherical shell;
an inlet is configured to allow mixed gas of deuterium and tritium to be continuously introduced into the magnetic confinement space, which allows a nuclear fusion chain reaction to be maintained;
the water pipe is arranged to cause water therein to be heated into vapor by the released energy;
the air extraction unit is arranged to cause vapor to be discharged from the water pipe.

2. The nuclear fusor apparatus according to claim 1, wherein each of the orbiting members is of an arc shape conforming to a section of a circumference the annular ferromagnetic guide rails; and a length of each of the orbiting members is smaller than the circumference of the annular ferromagnetic guide rails.

3. The nuclear fusor apparatus according to claim 1, wherein further comprising a plurality of orbiting members which are independent from each other, and the orbiting members are distributed at an interval around the circumferential direction of the annular ferromagnetic guide rails.

4. The nuclear fusor apparatus according to claim 1, wherein the water pipe is coiled and positioned inside a body of the spherical shell.

5. The nuclear fusor apparatus according to claim 1, wherein the ignition is a laser heating unit.

6. The nuclear fusor apparatus according to claim 1, wherein the nuclear fusor apparatus further comprises a vacuum extraction unit, and the vacuum extraction unit is fixed on the outer wall of the spherical shell, and the vacuum extraction unit has an extraction end extending into the spherical shell.

7. The nuclear fusor apparatus according to claim 1, wherein the spherical shell is fixed by a support.

8. The nuclear fusor apparatus according to claim 2, wherein the nuclear fusor apparatus further comprises a vacuum extraction unit, and the vacuum extraction unit is fixed on the outer wall of the spherical shell, and has an extraction end extending into the spherical shell.

9. The nuclear fusor apparatus according to claim 2, wherein the spherical shell is fixed by a support.

10. The nuclear fusor apparatus according to claim 3, wherein the nuclear fusor apparatus further comprises a vacuum extraction unit, and the vacuum extraction unit is fixed on the outer wall of the spherical shell, and has an extraction end extending into the spherical shell.

11. The nuclear fusor apparatus according to claim 3, wherein the spherical shell is fixed by a support.

12. The nuclear fusor apparatus according to claim 4, wherein the nuclear fusor apparatus further comprises a vacuum extraction unit, and the vacuum extraction unit is fixed on the outer wall of the spherical shell, and has an extraction end extending into the spherical shell.

13. The nuclear fusor apparatus according to claim 4, wherein the spherical shell is fixed by a support.

14. The nuclear fusor apparatus according to claim 5, wherein the nuclear fusor apparatus further comprises a vacuum extraction unit, and the vacuum extraction unit is fixed on the outer wall of the spherical shell, and has an extraction end extending into the spherical shell.

15. The nuclear fusor apparatus according to claim 5, wherein the spherical shell is fixed by a support.

\* \* \* \* \*